(12) United States Patent
Tang (10) Patent No.: US 7,269,328 B2
(45) Date of Patent: Sep. 11, 2007

(54) BRIGHTNESS ENHANCEMENT FILM HAVING A LIGHT-GUIDING STRUCTURE

(75) Inventor: Shih-Chieh Tang, Tainan (TW)

(73) Assignee: Efon Technology Co., Ltd., Tainan (TW)

( * ) Notice: Subject to any disclaimer, the term of this patent is extended or adjusted under 35 U.S.C. 154(b) by 59 days.

(21) Appl. No.: 11/162,703

(22) Filed: Sep. 20, 2005

(65) Prior Publication Data
US 2007/0058920 A1    Mar. 15, 2007

(30) Foreign Application Priority Data
Sep. 13, 2005    (TW)    ............... 94131444 A (51) Int. Cl.
*G02B 6/10* (2006.01)
*G02B 6/34* (2006.01)
*G02F 1/1335* (2006.01)

(52) U.S. Cl. ............... 385/146; 385/36; 385/37; 385/901; 349/64; 349/65

(58) Field of Classification Search ............... 385/901, 385/31, 36, 37, 146, 147; 359/575, 619; 362/27, 31; 349/64, 65
See application file for complete search history.

(56) References Cited

U.S. PATENT DOCUMENTS

| | | | |
|---|---|---|---|
| 5,245,454 A * | 9/1993 | Blonder ............... 349/113 |
| 5,626,800 A | 5/1997 | Williams et al. ............. 264/1.38 |
| 6,277,471 B1 * | 8/2001 | Tang ............... 428/172 |
| 6,280,063 B1 | 8/2001 | Fong et al. ............. 362/333 |
| 6,339,458 B1 | 1/2002 | Ohkawa ............. 349/65 |
| 6,354,709 B1 | 3/2002 | Campbell et al. ............. 362/31 |
| 6,356,389 B1 | 3/2002 | Nilsen et al. ............. 359/625 |
| 6,581,286 B2 * | 6/2003 | Campbell et al. ............. 29/895.31 |
| 6,669,350 B2 | 12/2003 | Yamashita et al. ............. 362/31 |
| 6,707,611 B2 | 3/2004 | Gardiner et al. ............. 359/619 |
| 6,759,113 B1 * | 7/2004 | Tang ............... 428/156 |
| 6,845,212 B2 * | 1/2005 | Gardiner et al. ............. 385/146 |
| 6,862,141 B2 * | 3/2005 | Olczak ............. 359/621 |
| 6,951,400 B2 * | 10/2005 | Chisholm et al. ............. 362/29 |
| 6,981,792 B2 * | 1/2006 | Nagakubo et al. ............. 362/600 |
| 7,090,389 B2 * | 8/2006 | Parker et al. ............. 362/627 |
| 2005/0007513 A1 * | 1/2005 | Lee et al. ............. 349/57 |
| 2005/0237641 A1 * | 10/2005 | Tang ............. 359/831 |
| 2007/0002471 A1 * | 1/2007 | Tang ............. 359/831 |

* cited by examiner

*Primary Examiner*—Frank G. Font
*Assistant Examiner*—Charlie Peng
(74) *Attorney, Agent, or Firm*—Alan Kamrath; Kamrath & Associates PA (57) ABSTRACT

A brightness enhancement film having a light-guiding structure includes a substrate, which has a light-guiding layer and a plurality of light-refracting microstructures. The substrate has a light incident surface and a light emission surface opposite thereto. The light-refracting microstructures are arranged on the light incident surface of the substrate and are provided for varying surface curvatures to refract incident light. The light-guiding layer is arranged on the light emission surface of the substrate and is provided for guiding refracted light to generate homogeneous light to emit therefrom.

32 Claims, 7 Drawing Sheets

FIG. 10

BRIGHTNESS ENHANCEMENT FILM HAVING A LIGHT-GUIDING STRUCTURE

BACKGROUND OF THE INVENTION

1. Field of the Invention

The present invention relates to a brightness enhancement film having a light-guiding structure for use in a liquid crystal display. Particularly, the present invention relates to the brightness enhancement film including a light-guiding layer and a light-refracting microstructure layer at either side thereof. More particularly, the present invention relates to the brightness enhancement film using the light-refracting microstructure to generate refracted light, and the light-guiding layer to guide the refracted light for providing homogeneous light.

2. Description of the Related Art

Figure 1:
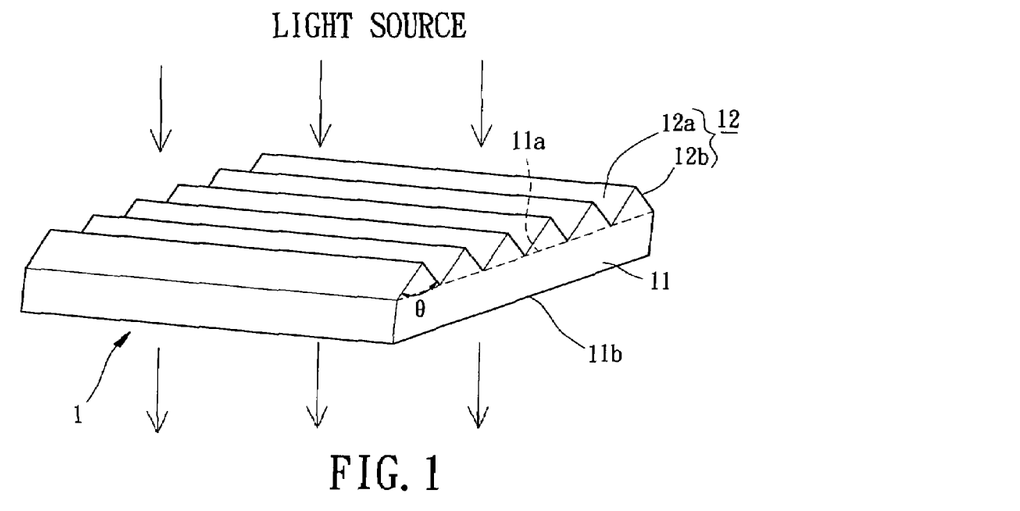
FIG. 1 is a perspective view of a brightness enhancement film having a light-guiding structure in accordance with a first embodiment of the present invention.

Referring initially to FIG. 1, U.S. Pat. No. 5,626,800, entitled "Prevention of Groove Tip Deformation in Brightness Enhancement Film," discloses a brightness enhancement film including a substrate (i.e. base) and a plurality of prism units provided thereon. The prism units are arranged and juxtaposed on a top surface (i.e. light emission surface) of the substrate in order. Each of the prism units located on the light emission surface consists of a first inclined surface and a second inclined surface connected thereto, and serves to refract light, which had penetrated through the substrate, in use for enhancing brightness of light.

The substrate of the brightness enhancement film has a bottom surface (i.e. light incident surface) which is an ordinary flat surface and opposite to the top surface. In use, light projected from a light source enters the flat surface of the bottom surface and then passes through the substrate. Subsequently, the light can further pass through the top surface of the substrate, and the prism units of the substrate eventually refract the light such that the refracted light can be generated from the light emission surface of the substrate.

However, the substrate of the brightness enhancement film permits directly emitting the refracted light from the light emission surface of the substrate without passing it through any guiding means. The light emission surface of the substrate cannot generate homogeneous refracted light due to the lack of any guiding means disposed on the light emission surface. In other words, the refracted light can appear a degree of homogeneous characteristic if the light emission surface of the substrate is provided with an additional light-guiding layer to solve the above problem. Another problem with the manufacture of such an additional light-guiding layer raises difficulty in reducing the entire thickness of the substrate of the brightness enhancement film. Hence, there is a need for improving the conventional brightness enhancement film in both enhancing homogeneous light and reducing a thickness of the substrate.

Another problem with the manufacture of the substrate of the conventional brightness enhancement film generally forms a bottom surface which is an ordinary flat surface without forming any structure and opposite to the top surface on which to provide the microstructure of the prism units. However, the top surface and the bottom surface disposed on the substrate of the brightness enhancement film are unmatched in structure which may cause a specific degree of warpage of the brightness enhancement film in nature. Furthermore, the brightness enhancement films are piled upon each other on a conveyer if the products are finally made. This practice unavoidably causes warpage and abrasion between the surfaces of the separate brightness enhancement films, and disadvantageously affects quality and quantity of output of the brightness enhancement films.

U.S. Pat. No. 6,280,063, entitled "Brightness Enhancement Article," also discloses another brightness enhancement film including a substrate, a prism unit layer and a light-diffusing surface. The prism unit layer and the light-diffusing surface serve as a top surface (i.e. light emission surface) and a bottom surface (i.e. light incident surface) of the substrate. This permits light to penetrate through the substrate from the light-diffusing surface to the prism unit layer where light is emitted. Typically, the light-diffusing surface contains several light-diffusing particles which naturally diffuse light. Correspondingly, the prism unit layer is used to refract light penetrating the brightness enhancement film.

Similarly, the substrate of the brightness enhancement film permits directly emitting the refracted light from the light emission surface of the substrate without passing it through any guiding means. Also, the light emission surface of the substrate cannot generate homogeneous refracted light if the light emission surface of the substrate is provided with no light-guiding layer to solve this problem. Inevitably, another problem with the manufacture of such an additional light-guiding layer raises difficulty in reducing the entire thickness of the substrate of the brightness enhancement film. There is an unavoidable need for improving such a brightness enhancement film in both enhancing homogeneous light and reducing a thickness of the substrate.

Even though the brightness enhancement film has the light-diffusing surface at its bottom side, the light-diffusing surface is still inadequate to prevent warpage of the brightness enhancement film in nature. Furthermore, the light-diffusing particles of the brightness enhancement film protrude like raised particles on the light-diffusing surface and, thus, scrape the surface of another brightness enhancement film while piling upon each other. Also, this practice unavoidably causes warpage and abrasion of the surfaces of the brightness enhancement films and disadvantageously affects quality and quantity of output of the brightness enhancement films.

There are numerous other patent publications, for instance, U.S. Pat. No. 6,354,709, U.S. Pat. No. 6,707,611, U.S. Pat. No. 6,669,350, and U.S. Pat. No. 6,339,458, etc., that describe a brightness enhancement film but fail to provide light-guiding means on the light emission surface for enhancing brightness.

The present invention intends to provide a brightness enhancement film having a plurality of light-refracting microstructures and a light-guiding layer, wherein the light-refracting microstructures are arranged on a light incident surface while the light-guiding layer is arranged on a light emission surface. The light-refracting microstructure can refract light, and subsequently, the light-guiding layer can guide the refracted light for providing homogeneous light in such a way as to mitigate and overcome the above problem.

In addition, the present invention also intends to provide the brightness enhancement film having a reinforcing layer at one side thereof. The reinforcing layer provides a specific degree of hardness, thereby preventing the brightness enhancement film from occurrence of warpage and abrasion by another in such a way as to mitigate and overcome the above problem.

SUMMARY OF THE INVENTION

The primary objective of this invention is to provide a brightness enhancement film having a light-refracting microstructure layer arranged on a light incident surface, and a light-guiding layer arranged on a light emission surface. The light-refracting microstructure can refract light, and subsequently, the light-guiding layer can guide the refracted light. Accordingly, the light-guiding layer can provide homogeneous light for enhancing brightness.

The secondary objective of this invention is to provide a brightness enhancement film further including a reinforcing layer arranged on the light emission surface, wherein the reinforcing layer is made from a transparent material having a rate of shrinkage which can be controlled to have a specific degree of hardness. Accordingly, the reinforcing layer of the brightness enhancement film can prevent occurrence of warpage and abrasion by another.

Another objective of this invention is to provide the brightness enhancement film having the light-refracting microstructure layer, wherein the light-refracting microstructure can be selected from prism units, micro-hemispheres, micro cones, micro rippled ridges, meandering microstructures or curved prism units. Accordingly, the light-refracting microstructure can improve light refraction of the brightness enhancement film.

The brightness enhancement film in accordance with the present invention includes a substrate, and the substrate includes a light-guiding layer and a plurality of light-refracting microstructures. The substrate has a light incident surface and a light emission surface opposite thereto. The light-refracting microstructures are arranged on the light incident surface of the substrate and is provided for varying surface curvatures to refract incident light. The light-guiding layer is arranged on the light emission surface of the substrate and is provided for guiding refracted light to generate homogeneous light to emit therefrom.

In a separate aspect of the present invention, the brightness enhancement film further includes a reinforcing layer formed on the light emission surface of the substrate. The reinforcing layer is designed for having a relatively high degree of hardness to prevent the brightness enhancement film from occurrence of warpage and abrasion by another.

Further scope of the applicability of the present invention will become apparent from the detailed description given hereinafter. However, it should be understood that the detailed description and specific examples, while indicating preferred embodiments of the invention, are given by way of illustration only, since variations will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 2:
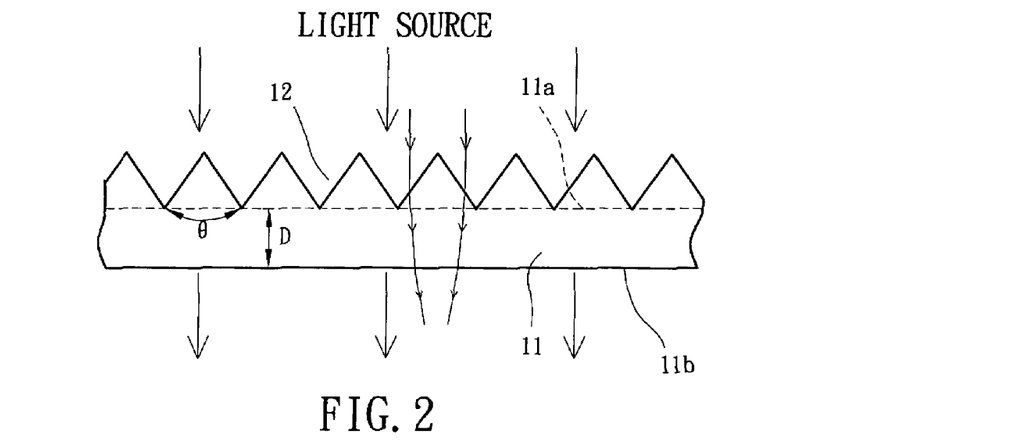
FIG. 2 is a side elevational view of the brightness enhancement film having the light-guiding structure in accordance with the first embodiment of the present invention.

Referring initially to FIGS. 1 and 2, a brightness enhancement film 1 having a light-guiding structure in accordance with a first embodiment of the present invention is a substrate constructed from a thin-sheet member. The substrate includes a light-guiding layer 11 and a plurality of prism units 12. Generally, the substrate has a light incident surface 11a (shown at a dotted line) at a first side of the light-guiding layer 11, and a light emission surface 11b at a second side of the light-guiding layer 11 which is opposite to the first side. The substrate is made from a transparent material to permit light to penetrate from the light incident surface 11a to the light emission surface 11b, and it can enhances brightness of light.

Still referring to FIGS. 1 and 2, a light-refracting microstructure layer of the brightness enhancement film 1 includes the prism units 12 provided with a light-refracting microstructure. The prism units 12 are arranged and juxtaposed on the light incident surface 11a of the light-guiding layer 11 in order that the light-refracting microstructure layer is deployed on the light incident surface 11a of the light-guiding layer 11 with respect to a light source identified as "LIGHT SOURCE" as shown in FIG. 1. The construction of the prism units 12 of the light-refracting microstructure layer shall be described in detail with reference to FIG. 1. Each of the prism units 12 has a predetermined height raised from the light incident surface 11a of the light-guiding layer 11, and consists of a first flat inclined surface 12a and a second flat inclined surface 12b connected thereto. In use, the first inclined surfaces 12a and the second inclined surfaces 12b serve to refract light from the light source in at least one dimension for enhancing brightness of light. Formed between the first inclined surfaces 12a and the second inclined surfaces 12b is an included angle "θ", preferably ranging between 60 degrees and 75 degrees.

Still referring to FIG. 2, the light-guiding layer 11 is made from a transparent material having a predetermined degree of refractive index. The light-guiding layer 11 has a thickness as indicated as "D", 500 µm for example. The thickness "D" of the light-guiding layer 11 is sufficient to guide the refracted light transmitted from the light-refracting microstructure layer from the light incident surface 11a to the light emission surface 11b. The light emission surface 11b of the light-guiding layer 11 only permits emitting within a predetermined range of angles of the refracted light with respect to its horizontal surface so as to provide homogeneous light on the light emission surface 11b. Thus, the light-guiding layer 11 can limit emission of the refracted light to the predetermined range of angles. Accordingly, no refracted light beyond the predetermined range of angles is emitted.

Referring back to FIG. 1, in the first embodiment, the light-guiding layer 11 is preferably made from a transparent material having a specific degree of refractive index in nature. In an alternative embodiment, the light-guiding layer 11 and the prism units 12 of the light-refracting microstructure layer are preferably made from all the same transparent material, such as an epoxy or UV (ultraviolet) curable adhesive having a specific degree of refractive index in nature. Preferably, the light-refracting microstructure layer can be integrally formed on the light incident surface 11a of the light-guiding layer 11. In another embodiment, the light-guiding layer 11 and the prism units 12 of the light-refracting microstructure layer are separately made from different transparent materials and adhered to each other according to the design choice. Accordingly, the various materials and processes involved in the manufacture of the brightness enhancement film 1 can determine its performance and characteristics to widen its application.

Referring again to FIGS. 1 and 2, once light from the light source passes through the light incident surface 11a of the light-guiding layer 11, the first flat inclined surfaces 12a and the second flat inclined surfaces 12b of the prism units 12 can refract the light to generate the refracted light on the light incident surface 11a of the light-guiding layer 11. Subsequently, the refracted light from the prism units 12 of the light-refracting microstructure layer penetrates the transparent material of the light-guiding layer 11 to transmit to the light emission surface 11b of the light-guiding layer 11. This refractive index of the transparent material of the light-guiding layer 11 can determine an angle of light for total reflection on the light emission surface 11b. In light-guiding operation, the refractive index of the transparent material of the light-guiding layer 11 can determine a range of angles of the light to emit from the light emission surface 11b of the light-guiding layer 11. Generally, this permits the refracted light within a predetermined range of angles being emitted from the light emission surface 11b of the light-guiding layer 11. But, conversely, the light-guiding layer 11 can also guide the refracted light beyond a predetermined range of angles by continuously total reflection until a direction of the refracted light has been finally guided within the predetermined range of angles with respect to the horizontal plane of the light emission surface 11b of the light-guiding layer 11. Consequently, the light emission surface 11b of the light-guiding layer 11 can provide homogeneous light.

In use, the light-guiding layer 11 of the brightness enhancement film 1 in accordance with the present invention can be directly formed on a light emission side of the brightness enhancement film disclosed in U.S. Pat. No. 5,626,800, thus resulting in a "hybrid" one-piece design of the brightness enhancement film. In an alternative embodiment, the light-guiding layer 11 of the brightness enhancement film 1 in accordance with the present invention can be mechanically attached to a light emission side of the brightness enhancement film disclosed in U.S. Pat. No. 5,626,800, thus resulting in a "hybrid" two-piece design of the brightness enhancement film. In another embodiment, the light-guiding layer 11 of the brightness enhancement film 1 in accordance with the present invention can be directly formed on or mechanically attached to a light incident side of the brightness enhancement film disclosed in U.S. Pat. No. 5,626,800, with the brightness enhancement film providing homogeneous light.

Figure 3:
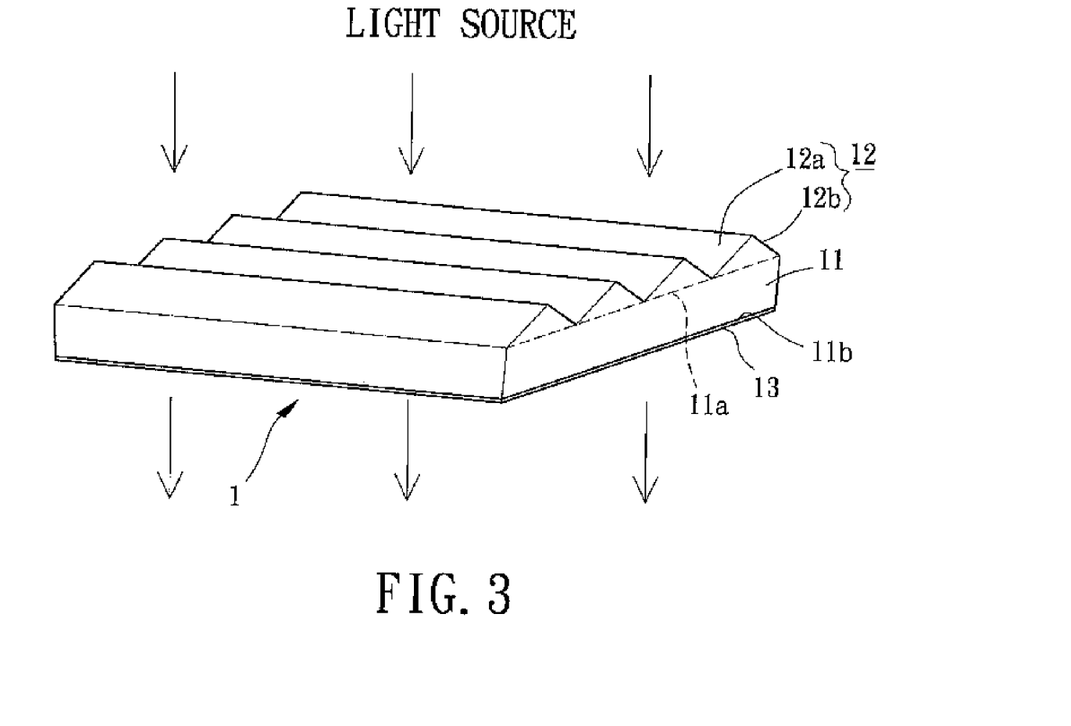
FIG. 3 is a perspective view of the brightness enhancement film having the light-guiding structure in accordance with a second embodiment of the present invention.

Turning now to FIG. 3, the brightness enhancement film 1 having a light-guiding structure in accordance with a second embodiment of the present invention is illustrated. In the second embodiment, the brightness enhancement film 1 includes a light-guiding layer 11, a plurality of prism units 12 and at least one reinforcing layer 13 which are stacked to constitute the brightness enhancement film 1. The reinforcing layer 13 covers the light-emission surface 11b of the light-guiding layer 11 to form a composite reinforced laminate by using one of coating, adhesive, physical vapor deposition or sputtering deposition. In an alternative embodiment, a number of the reinforcing layers 13 are arranged on the light-emission surface 11b of the light-guiding layer 11. There may be as many reinforcing layers 13 as desired, but in the second embodiment a single layer of the reinforcing layer 13 is formed. The reinforcing layer 13 is made from a transparent material, such as an acrylic resin, having a lower degree of refractive index relative to that of the light-guiding layer 11. Preferably, the transparent material of the reinforcing layer 13 has a hardness greater than that of the light-guiding layer 11 such that the reinforcing layer 13 can protect the light emission surface 11b of the light-guiding layer 11 from abrasion. In the second embodiment, the transparent material of the reinforcing layer 13 also has a rate of shrinkage substantially similar or approximately equal to that of the light-guiding layer 11. Furthermore, the reinforcing layer 13 is designed to possess a thickness ranging between 5 μm and 10 μm which may be achieved at a relatively reasonable cost in that the minimum of material is used in the intended manner. Advantageously, the thickness of the reinforcing layer 13 can be varied according to the thickness of the light-guiding layer 11. For instance, the reinforcing layer 13 can be designed to have an increase of the thickness if the thickness of the light-guiding layer 11 is reduced. However, dimensions of the reinforcing layer 13 bear adequate strength to withstand normal usage of the brightness enhancement film 1.

Still referring to FIG. 3, the manufacture of the brightness enhancement film 1 in accordance with the second embodiment of the present invention shall be described in detail. The arrangement of the first flat inclined surfaces 12a and the second flat inclined surfaces 12b of the prism units 12 can be varied according to the design need. Such practice may, however, cause spontaneous warpage of the light-guiding layer 11. The reinforcing layer 13 can perform a relatively high degree of hardness that may alleviate the possibility of occurring warpage of the brightness enhancement film 1. Consequently, the brightness enhancement film 1 has a high degree of warpage resistance. Furthermore, the hardness of the reinforcing layer 13 can protect the light emission surface 11b of the light-guiding layer 11 against abrasion and scraping. Consequently, the brightness enhancement film 1 can carry out a high degree of abrasion resistance.

Still referring to FIG. 3, in manufacture, the light incident surface 11a of the light-guiding layer 11 can be initially formed with the prism units 12 so as to constitute the light-refracting microstructure layer in advance. Subsequently, the light emission surface 11b of the light-guiding layer 11 can be formed with the reinforcing layer 13 so as to constitute a composite laminate. In an alternative embodiment, the light emission surface 11b of the light-guiding layer 11 can be initially formed with the reinforcing layer 13 so as to constitute a composite laminate in advance. Subsequently, the light incident surface 11a of the light-guiding layer 11 can be formed with the prism units 12 so as to constitute the light-refracting microstructure layer.

Figure 4:
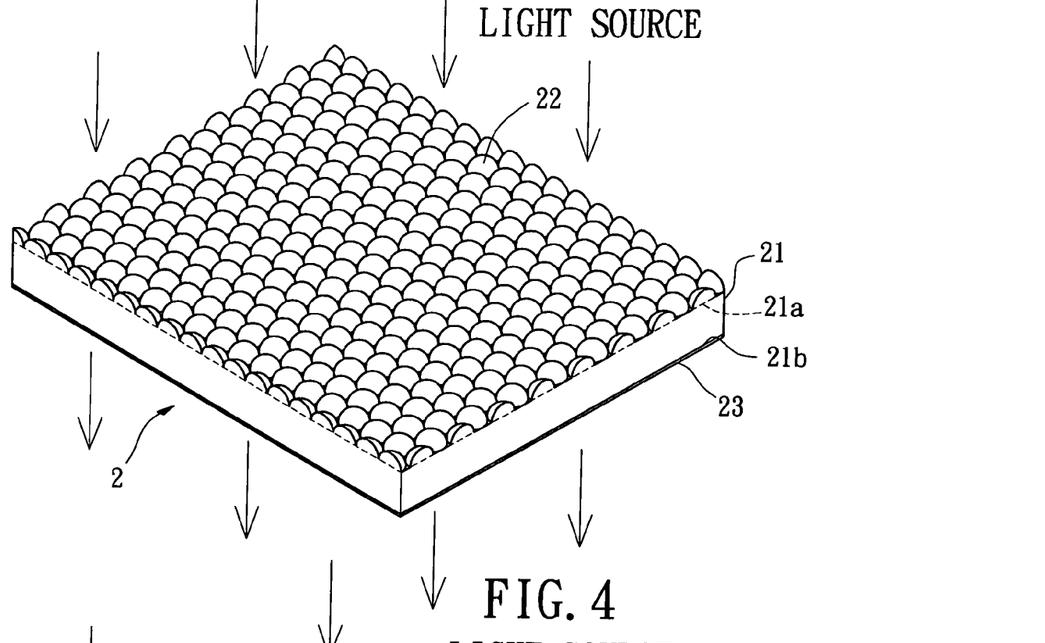
FIG. 4 is a perspective view of the brightness enhancement film having the light-guiding structure in accordance with a third embodiment of the present invention.

Turning now to FIG. 4, the brightness enhancement film 2 having a light-guiding structure in accordance with a third embodiment of the present invention is illustrated. In the third embodiment, the brightness enhancement film 2 includes a light-guiding layer 21, a plurality of micro-hemispheres 22 and a reinforcing layer 23 which are stacked to constitute the brightness enhancement film 2. Generally, the light-guiding layer 21 has a light incident surface 21a and a light emission surface 21b opposite thereto. The light-refracting microstructure layer consists of the micro-hemispheres 22 which are raised on the light incident surface 21a of the light-guiding layer 21 and arranged to form an array of hexagonal units of the micro-hemispheres 22. Conversely, the reinforcing layer 23 covers the light emission surface 21b of the light-guiding layer 21 to form a composite reinforced laminate. In the third embodiment, the micro-hemispheres 22 of the light-refracting microstructure layer are used to refract light, and arranged to form a plurality of hexagonal units in a hexagonal manner such that each of the micro-hemispheres 22 has six of the adjacent micro-hemispheres 22. In use, the micro-hemispheres 22 serve to circularly refract light projecting from the light source in two dimensions for enhancing brightness of light. Additionally, the reinforcing layer 23 can perform a relatively high degree of hardness so that the brightness enhancement film 2 has a high degree of warpage resistance and abrasion resistance.

Figure 5:
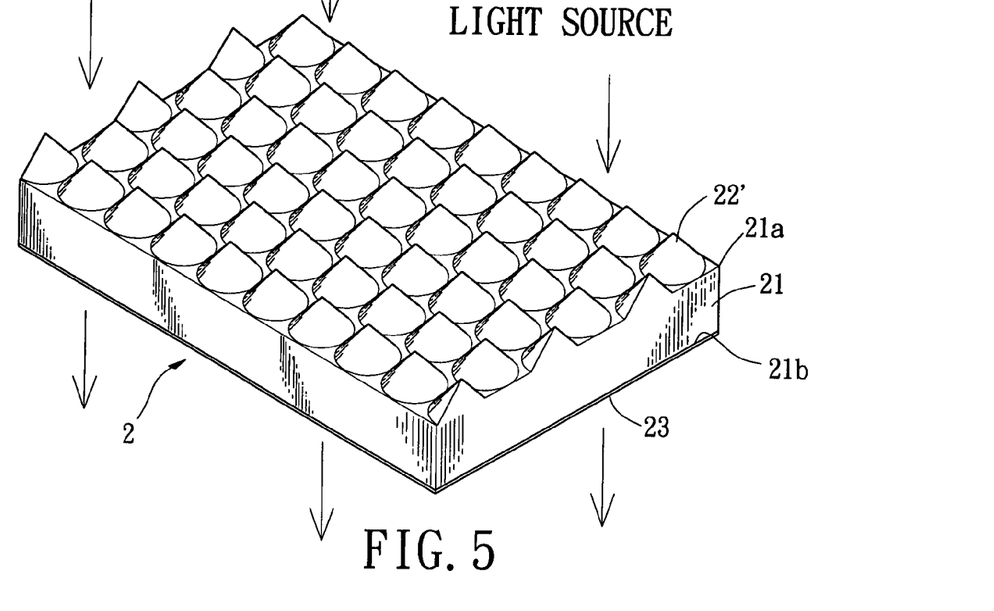
FIG. 5 is a perspective view of the brightness enhancement film having the light-guiding structure in accordance with a fourth embodiment of the present invention.

Turning now to FIG. 5, the brightness enhancement film 2 having a light-guiding structure in accordance with a fourth embodiment of the present invention is illustrated. In the fourth embodiment, the brightness enhancement film 2 includes a light-guiding layer 21, a plurality of micro cones 22' and a reinforcing layer 23 which are stacked to constitute the brightness enhancement film 2. Generally, the light-guiding layer 21 has a light incident surface 21a and a light emission surface 21b opposite thereto. The light-refracting microstructure layer consists of the micro cones 22' which are raised on the light incident surface 21a of the light-guiding layer 21 and arranged to form an array of hexagonal units of the micro cones 22'. Conversely, the reinforcing layer 23 covers the light emission surface 21b of the light-guiding layer 21 to form a composite reinforced laminate. In the fourth embodiment, the micro cones 22' of the light-refracting microstructure layer are used to refract light and are arranged to form a plurality of hexagonal units in a hexagonal manner such that each of the micro cones 22' has six of the adjacent micro cones 22'. In use, the micro cones 22' serve to circularly refract light projecting from the light source in two dimensions for enhancing brightness of light. In comparison with the third embodiment, the micro cones 22' of the fourth embodiment can advantageously alleviate the deficiency of bright light spots generated from the micro-hemispheres 22 of the third embodiment. Additionally, the reinforcing layer 23 can perform a relatively high degree of hardness so that the brightness enhancement film 2 has a high degree of warpage resistance and abrasion resistance.

Figure 6:
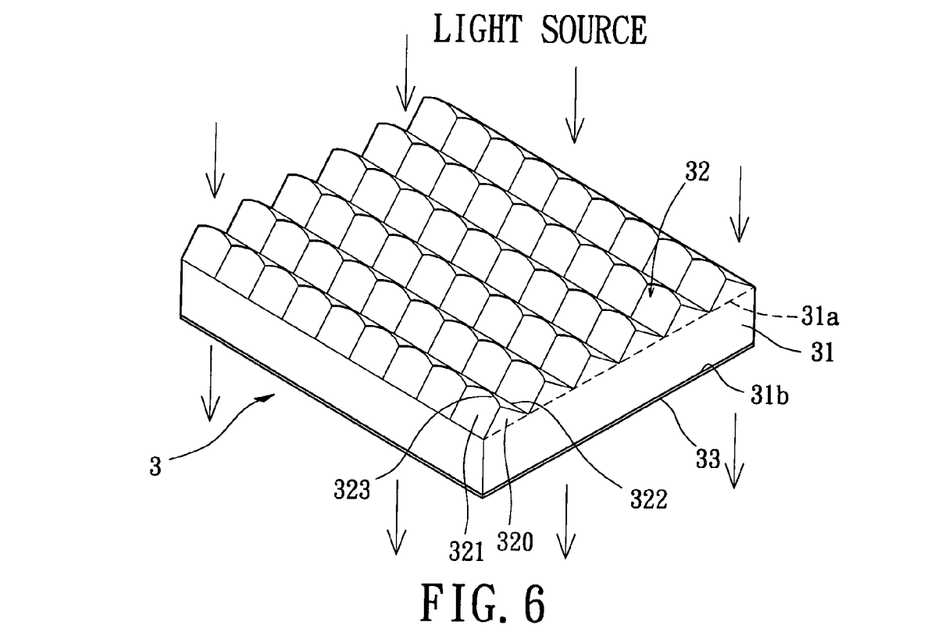
FIG. 6 is a perspective view of the brightness enhancement film having the light-guiding structure in accordance with a fifth embodiment of the present invention.

Turning now to FIG. 6, the brightness enhancement film 3 having a light-guiding structure in accordance with a fifth embodiment of the present invention is illustrated. In the fifth embodiment, the brightness enhancement film 3 includes a light-guiding layer 31, a plurality of micro rippled ridges 32 and a reinforcing layer 33 which are stacked to constitute the brightness enhancement film 3. Generally, the light-guiding layer 31 has a light incident surface 31a and a light emission surface 31b opposite thereto. The light-refracting microstructure layer consists of the micro rippled ridges 32 which are raised and juxtaposed on the light incident surface 31a of the light-guiding layer 31 in order. Each of the micro rippled ridges 32 consists of a plurality of micro light-condensing units 320 substantially having a common height, and each of which has a pair of curved surfaces 321, a pair of common trough lines 322 and a common ridgeline 323. Typically, the curved surface 321 of the micro light-condensing unit 320 has an inclination from the common ridgeline 323 to the common trough line 322. Preferably, the common trough line 322 is substantially constructed from a straight line while the common ridgeline 323 is substantially constructed from a curved line. In order to reinforce and protect the brightness enhancement film 3, the reinforcing layer 33 covers the light emission surface 31b of the light-guiding layer 31 to form a composite reinforced laminate. In use, the micro light-condensing units 320 serve to refract light projecting from the light source in two dimensions for enhancing brightness of light. Additionally, the reinforcing layer 33 can perform a relatively high degree of hardness so that the brightness enhancement film 3 has a high degree of warpage resistance and abrasion resistance.

Figure 7:
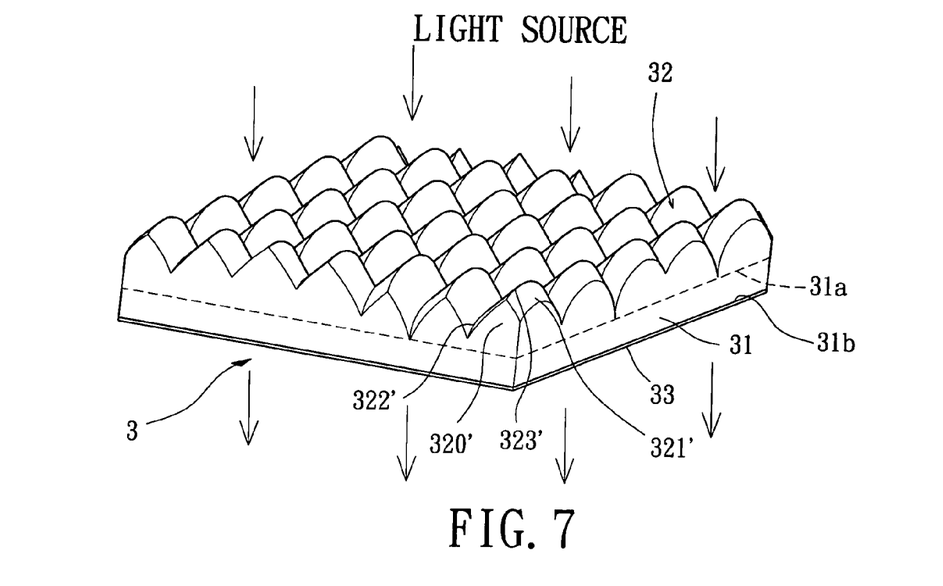
FIG. 7 is a perspective view of the brightness enhancement film having the light-guiding structure in accordance with a sixth embodiment of the present invention.

Turning now to FIG. 7, the brightness enhancement film 3 having a light-guiding structure in accordance with a sixth embodiment of the present invention is illustrated. In the sixth embodiment, the brightness enhancement film 3 includes a light-guiding layer 31, a plurality of micro rippled ridges 32 and a reinforcing layer 33 which are stacked to constitute the brightness enhancement film 3. Generally, the light-guiding layer 31 has a light incident surface 31a and a light emission surface 31b opposite thereto. The light-refracting microstructure layer consists of the micro rippled ridges 32 which are raised and juxtaposed on the light incident surface 31a of the light-guiding layer 31 in order. Each of the micro rippled ridges 32 consists of a plurality of micro light-condensing units 320' substantially having a common height, and each of which has a pair of curved surface 321', a pair of trough bottom lines 322' and a peak line 323'. Typically, the curved surface 321' of the micro light-condensing unit 320' has a uniform curvature from the peak line 323' to the trough bottom line 322'. In comparison with the fifth embodiment, the trough bottom line 322' of the sixth embodiment is substantially constructed from a curved line which permits a portion of the curved surface 321'adjacent to the trough bottom line 322' to have a uniform curvature. In order to reinforce and protect the brightness enhancement film 3, the reinforcing layer 33 covers the second surface 31b of the substrate 31 to form a composite reinforced laminate. In use, the micro light-condensing units 320' serve to refract light projecting from the light source in two dimensions for enhancing brightness of light. Additionally, the reinforcing layer 33 can perform a relatively high degree of hardness so that the brightness enhancement film 3 has a high degree of warpage resistance and abrasion resistance.

Figure 8:
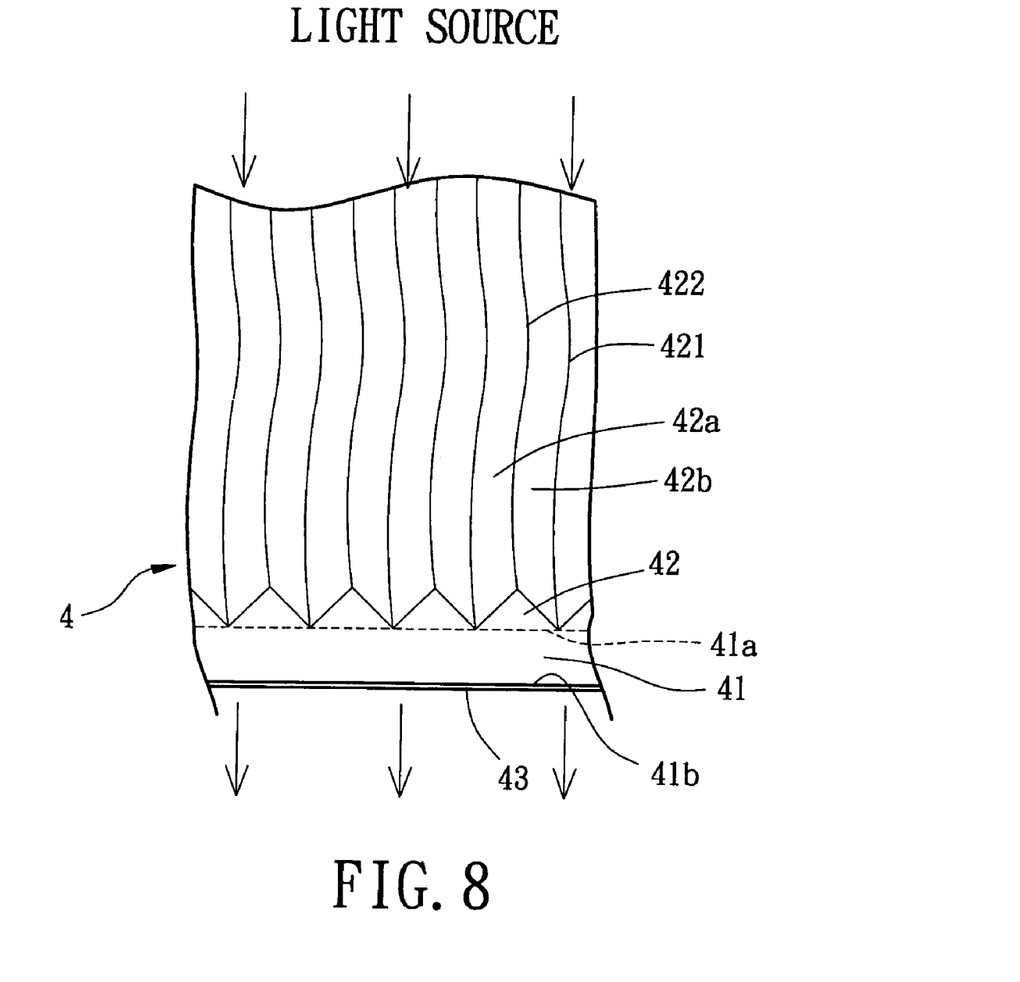
FIG. 8 is a partially enlarged perspective view of the brightness enhancement film having the light-guiding structure in accordance with a seventh embodiment of the present invention.

Turning now to FIG. 8, the brightness enhancement film 4 having a light-guiding structure in accordance with a seventh embodiment of the present invention is illustrated. In the seventh embodiment, the brightness enhancement film 4 includes a light-guiding layer 41, a plurality of curved prism units 42 and a reinforcing layer 43 which are stacked to constitute the brightness enhancement film 4. Generally, the light-guiding layer 41 has a light incident surface 41a and a light emission surface 41b opposite thereto. In comparison with the first embodiment, the light-refracting microstructure layer of the seventh embodiment consists of the curved prism units 42 which are raised on the light incident surface 41a of the light-guiding layer 41 and parallel to each other. Conversely, the reinforcing layer 43 covers the light emission surface 41b of the light-guiding layer 41 to form a composite reinforced laminate. In the seventh embodiment, each of the curved prism units 42 has a pair of meandering surfaces 42a, 42b, a pair of common trough lines 421 and a common ridge 422. Preferably, each of the curved prisms 42 substantially has a common horizontal width and a common vertical height, and each of the meandering surfaces 42a, 42b of the curved prisms 42 substantially has the same changes in curvature. At least one of the meandering surfaces 42a and 42b forms a curved surface having changes in curvature. Directions of the meandering surfaces 42a, 42b relative to a longitudinal direction of the curved prism unit 42 vary along a length of the curved prism unit 42. In use, the meandering surfaces 42a, 42b serve to refract light projecting from the light source in two dimensions for enhancing brightness of light and attenuating the morie phenomenon. Additionally, the reinforcing layer 43 can perform a relatively high degree of hardness so that the brightness enhancement film 4 has a high degree of warpage resistance and abrasion resistance.

Figure 9:
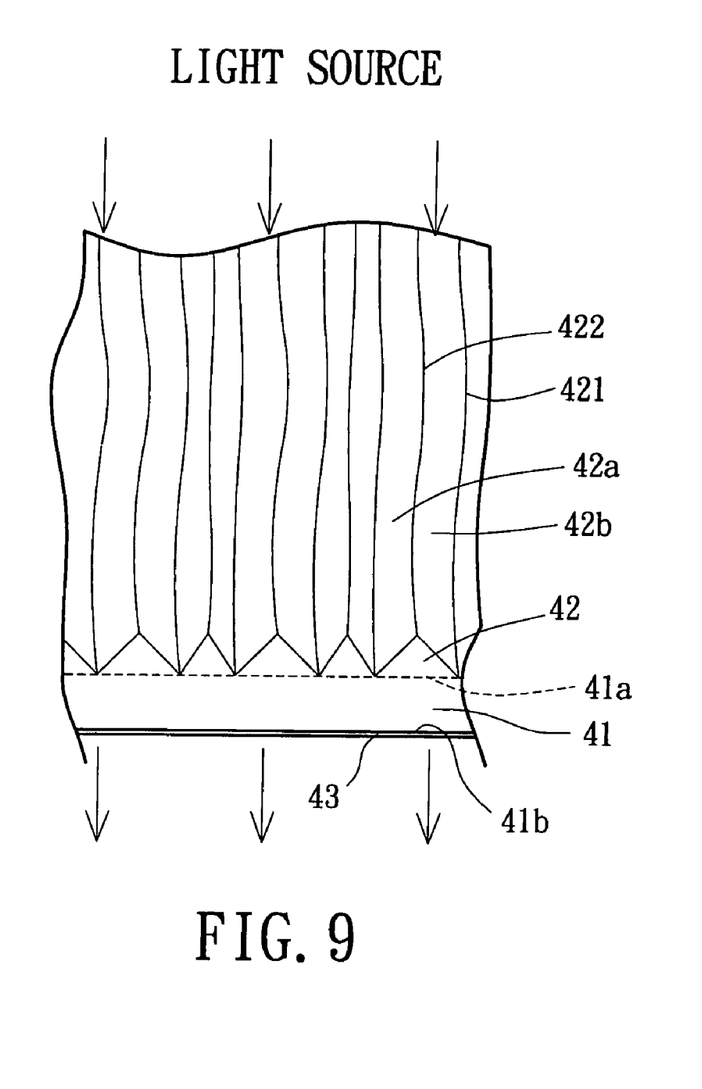
FIG. 9 is a partially enlarged perspective view of the brightness enhancement film having the light-guiding structure in accordance with a eighth embodiment of the present invention.

Turning now to FIG. 9, the brightness enhancement film 4 having a light-guiding structure in accordance with an eighth embodiment of the present invention is illustrated. In the eighth embodiment, the brightness enhancement film 4 includes a light-guiding layer 41, a plurality of curved prism units 42 and a reinforcing layer 43 which are stacked to constitute the brightness enhancement film 4. Generally, the light-guiding layer 41 has a light incident surface 41a and a light emission surface 41b opposite thereto. The light-refracting microstructure layer consists of the curved prism units 42 which are raised on the light incident surface 41a of the light-guiding layer 41 and parallel to each other. Conversely, the reinforcing layer 43 covers the light emission surface 41b of the light-guiding layer 41 to form a composite reinforced laminate. Each of the curved prism units 42 has a pair of meandering surfaces 42a, 42b, a pair of common trough lines 421 and a common ridge 422. In comparison with the seventh embodiment, each of the curved prisms 42 of the eighth embodiment substantially has a common vertical height but varies in horizontal widths such that each of the meandering surfaces 42a, 42b of the curved prisms 42 varies in curvature. At least one of the meandering surfaces 42a and 42b forms a curved surface having changes in curvature. In use, the meandering surfaces 42a, 42b serve to refract light projecting from the light source in two dimensions for enhancing brightness of light and attenuating the morie phenomenon. Additionally, the reinforcing layer 43 can perform a relatively high degree of hardness so that the brightness enhancement film 4 has a high degree of warpage resistance and abrasion resistance.

Figure 10:
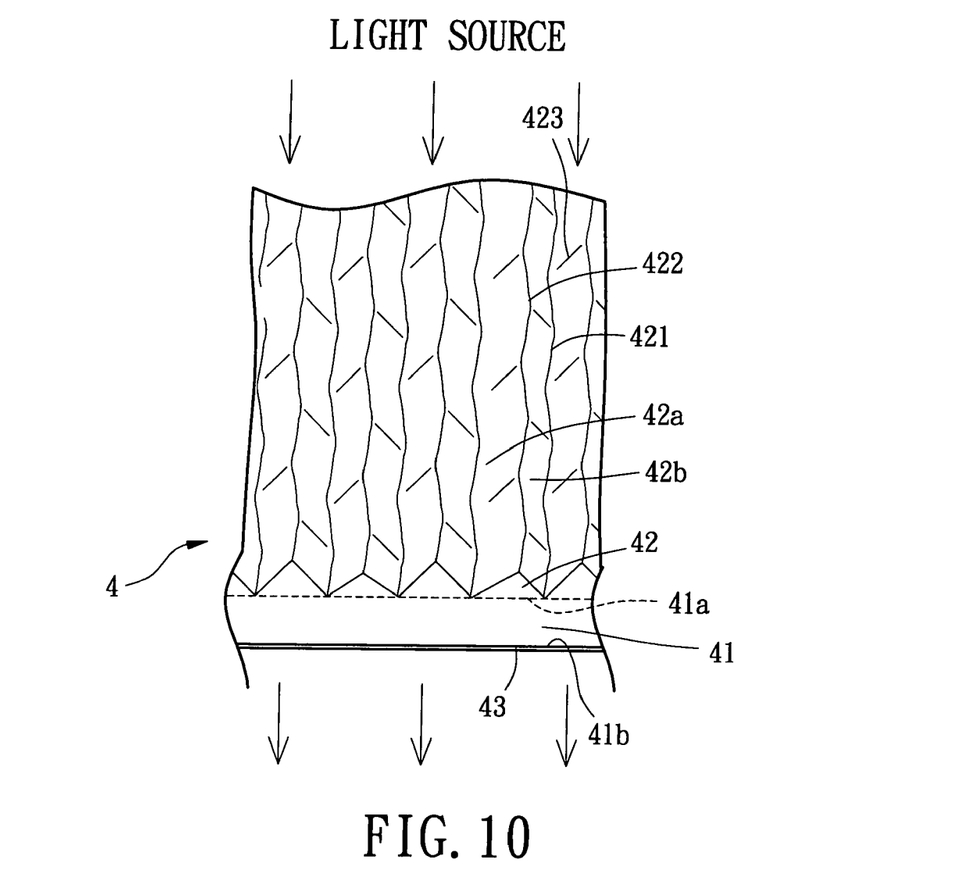
FIG. 10 is a partially enlarged perspective view of the brightness enhancement film having the light-guiding structure in accordance with an ninth embodiment of the present invention.

Turning now to FIG. 10, the brightness enhancement film 4 having a light-guiding structure in accordance with a ninth embodiment of the present invention is illustrated. In the ninth embodiment, the brightness enhancement film 4 includes a light-guiding layer 41, curved prism units 42 and a reinforcing layer 43 which are stacked to constitute the brightness enhancement film 4. Generally, the light-guiding layer 41 has a light incident surface 41a and a light emission surface 41b opposite thereto. The light-refracting microstructure layer consists of the curved prism units 42 which are raised on the light incident surface 41a of the light-guiding layer 41 and parallel to each other. Conversely, the reinforcing layer 43 covers the light emission surface 41b of the light-guiding layer 41 to form a composite reinforced laminate. Each of the curved prism units 42 has a pair of meandering surfaces 42a, 42b, a pair of common trough lines 421 and a common ridge 422. In comparison with the seventh embodiment, each of the curved prisms 42 of the ninth embodiment substantially has a common horizontal width but varies in vertical heights such that each of the meandering surfaces 42a, 42b of the curved prisms 42 varies in curvature. Preferably, each of the first meandering surface 42a and the second meandering surface 42b consists of a plurality of lateral ridges 423 arranged in staggered manner in a longitudinal direction to provide changes in curvature. In use, the meandering surfaces 42a, 42b serve to refract light projecting from the light source in two dimensions for enhancing brightness of light and attenuating the morie phenomenon. Additionally, the reinforcing layer 43 can perform a relatively high degree of hardness so that the brightness enhancement film 4 has a high degree of warpage resistance and abrasion resistance.

It will be apparent from the aforementioned discussions that since the prism units of the conventional light-refracting layers are arranged on the top surface (i.e. light emission surface) of the substrate to directly emit the refracted light, the brightness enhancement film cannot generate homogeneous light on the light emission surface. Conversely, the light-refracting layer of the present invention is changed to arrange on the light incident surface, and the light-guiding layer can be maintained between the light incident surface and the light emission surface so that the brightness enhancement film 1, 2, 3, 4 can provide homogeneous light.

In addition, the top surface (i.e. light emission surface) and the bottom surface (i.e. light incident surface) disposed on the conventional brightness enhancement film are unmatched in structure which may cause a specific degree of warpage of the brightness enhancement film. However, the brightness enhancement film of the present invention provides with the light-refracting microstructure layer and the reinforcing layer 13 on the light incident surface 11a and the light emission surface 11b respectively. As a result, the reinforcing layer 13 can perform a relatively high degree of hardness so that the brightness enhancement film 1, 2, 3, 4 has a high degree of warpage resistance and abrasion resistance, as best shown in FIG. 3.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A brightness enhancement film having a light-guiding structure comprising:

a substrate having a light incident surface and a light emission surface, the substrate made from a first transparent material which permits penetrating light through the substrate;

a light-refracting layer arranged on the light incident surface of the substrate, the light-refracting layer providing changes in curvature so as to refract the light projecting from a light source;

a light-guiding layer formed between the light incident surface and the light emission surface of the substrate so as to guide the refracted light transmitting from the light incident surface to the light emission surface; and a reinforcing layer formed on the light emission surface of the substrate, said reinforcing layer being made from a second transparent material while the light-guiding layer of the substrate is made from the first transparent material;

wherein the reinforcing layer has a thickness which can be selectively changed depending on that of the light-guiding layer.

2. The brightness enhancement film having the light-guiding structure as defined in claim 1, wherein the light-guiding layer and the light-refracting layer are made from the same transparent material, and the light-refracting layer is directly formed on the light-guiding layer.

3. The brightness enhancement film having the light-guiding structure as defined in claim 1, wherein the light-guiding layer and the light-refracting layer are separately made from different transparent materials and adhered to each other.

4. The brightness enhancement film having the light-guiding structure as defined in claim 1, wherein the reinforcing layer has a hardness greater than that of the substrate such that the reinforcing layer protects the light emission surface of the substrate.

5. A brightness enhancement film having a light-guiding structure comprising:
   a substrate having a light incident surface and a light emission surface, the substrate made from a first transparent material which permits penetrating light through the substrate;
   a light-refracting layer arranged on the light incident surface of the substrate, the light-refracting layer providing changes in curvature so as to refract the light projecting from a light source;
   a light-guiding layer formed between the light incident surface and the light emission surface of the substrate so as to guide the refracted light transmitting from the light incident surface to the light emission surface; and
   a reinforcing layer formed on the light emission surface of the substrate, said reinforcing layer being made from a second transparent material while the light-guiding layer of the substrate is made from the first transparent material;
   wherein the second transparent material of the reinforcing layer has a rate of shrinkage substantially approximate to that of the substrate.

6. A brightness enhancement film having a light-guiding structure comprising:
   a substrate having a light incident surface and a light emission surface, the substrate made from a first transparent material which permits penetrating light through the substrate;
   a light-refracting layer arranged on the light incident surface of the substrate, the light-refracting layer providing changes in curvature so as to refract the light projecting from a light source;
   a light-guiding layer formed between the light incident surface and the light emission surface of the substrate so as to guide the refracted tight transmitting from the light incident surface to the light emission surface; and
   a reinforcing layer formed on the light emission surface of the substrate, said reinforcing layer being made from a second transparent material while the light-guiding layer of the substrate is made from the first transparent material;
   wherein the first transparent material has a first refractive index and the second transparent material has a second refractive index, the first refractive index is greater than the second refractive index.

7. The brightness enhancement film having the light-guiding structure as defined in claim 1, wherein the second transparent material is selected from a low refractive transparent material relative to that of the first transparent material.

8. The brightness enhancement film having the light-guiding structure as defined in claim 7, wherein the second transparent material is selected from acrylic resin.

9. The brightness enhancement film having the light-guiding structure as defined in claim 1, wherein the reinforcing layer has a thickness ranging between 5 μm and 10 μm.

10. The brightness enhancement film having the light-guiding structure as defined in claim 1, wherein the reinforcing layer covers the light emission surface of the substrate to form a composite reinforced laminate by coating.

11. The brightness enhancement film having the light-guiding structure as defined in claim 1, wherein the reinforcing layer covers the light emission surface of the substrate to form a composite reinforced laminate by adhesive.

12. The brightness enhancement film having the light-guiding structure as defined in claim 1, wherein the reinforcing layer covers the light emission surface of the substrate to form a composite reinforced laminate by physical vapor deposition or sputtering deposition.

13. The brightness enhancement film having the light-guiding structure as defined in claim 1, wherein the light-refracting layer consists of a plurality of prism units, and each of which consists of a first flat inclined surface and a second flat inclined surface.

14. The brightness enhancement film having the light-guiding structure as defined in claim 13, wherein an included angle is formed between the first flat inclined surface and the second flat inclined surface of the light-refracting layer, and the included angle ranges between 60 degrees and 75 degrees.

15. The brightness enhancement film having the light-guiding structure as defined in claim 1, wherein the light-refracting layer consists of a plurality of micro-hemispheres.

16. The brightness enhancement film having the light-guiding structure as defined in claim 15, wherein the micro-hemispheres are arranged to form a plurality of hexagonal units in a hexagonal manner such that each of the micro-hemispheres has six of the adjacent micro-hemispheres.

17. The brightness enhancement film having the light-guiding structure as defined in claim 1, wherein the light-refracting microstructure layer consists of a plurality of micro cones.

18. The brightness enhancement film having the light-guiding structure as defined in claim 17, wherein the micro cones are arranged to form a plurality of hexagonal units in a hexagonal manner such that each of the micro cones has six of the adjacent micro cones.

19. The brightness enhancement film having the light-guiding structure as defined in claim 1, wherein the light-refracting layer consists of a plurality of micro rippled ridges, and each of which consists of a plurality of micro light-condensing units substantially having a common height, each of the micro light-condensing units further has a pair of curved surfaces a pair of common trough lines and a common ridge line.

20. The brightness enhancement film having the light-guiding structure as defined in claim 19, wherein the trough line of the micro light-condensing unit is substantially constructed from a straight line.

21. The brightness enhancement film having the light-guiding structure as defined in claim 19, wherein the trough line of the micro light-condensing unit is substantially constructed from a curved line.

22. The brightness enhancement film having the light-guiding structure as defined in claim 19, wherein the common ridgeline of the micro light-condensing unit is substantially constructed from a curved line.

23. The brightness enhancement film having the light-guiding structure as defined in claim 1, wherein the light-refracting layer consists of a plurality of curved prism units, and each of which having a pair of meandering surfaces, a pair of common trough lines and a common ridge.

24. The brightness enhancement film having the light-guiding structure as defined in claim 23, wherein each of the curved prisms substantially has a common vertical height and a common horizontal width such that each of the meandering surfaces of the curved prisms substantially has the same changes in curvature.

25. The brightness enhancement film having the light-guiding structure as defined in claim 23, wherein each of the curved prisms substantially has a common vertical height but varies in horizontal widths such that each of the meandering surfaces of the curved prisms varies in curvature.

26. The brightness enhancement film having the light-guiding structure as defined in claim 23, wherein each of the curved prisms substantially has a common horizontal width but varies in vertical heights such that each of the meandering surfaces of the curved prisms varies in curvature.

27. The brightness enhancement film having the light-guiding structure as defined in claim 23, wherein at least one of the meandering surfaces consists of a plurality of lateral ridges arranged in staggered mariner in a longitudinal direction to provide changes in curvature.

28. The brightness enhancement film having the light-guiding structure as defined in claim 1, wherein the light-refracting layer is integrally formed on the light incident surface of the substrate.

29. The brightness enhancement film having the light-guiding structure as defined in claim 1, wherein the light-refracting layer and the substrate are adhered to each other.

30. The brightness enhancement film having the light-guiding structure as defined in claim 1, wherein the first transparent material is selected from an epoxy or UV curable adhesive.

31. The brightness enhancement film having the light-guiding structure as defined in claim 5, wherein the reinforcing layer has a hardness greater than that of the substrate.

32. The brightness enhancement film having the light-guiding structure as defined in claim 5, wherein the second transparent material is selected from a low refractive transparent material relative to that of the first transparent material.

* * * * *